United States Patent
Sanders et al.

(10) Patent No.: US 11,132,465 B1
(45) Date of Patent: *Sep. 28, 2021

(54) REAL-TIME FEATURE LEVEL SOFTWARE SECURITY

(71) Applicant: Wells Fargo Bank, N.A., San Francisco, CA (US)

(72) Inventors: Adam Sanders, Huntersville, NC (US); David L. Frost, Charlotte, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/384,261

(22) Filed: Apr. 15, 2019

Related U.S. Application Data

(63) Continuation of application No. 15/142,274, filed on Apr. 29, 2016, now Pat. No. 10,262,156.

(51) Int. Cl.
  *G06F 21/62* (2013.01)
  *G06F 21/57* (2013.01)
  *H04L 29/06* (2006.01)

(52) U.S. Cl.
  CPC .......... *G06F 21/629* (2013.01); *G06F 21/577* (2013.01); *H04L 63/10* (2013.01);
  (Continued)

(58) Field of Classification Search
  CPC ....... G06F 21/629; G06F 21/577; H04L 63/10
  See application file for complete search history.

(56) References Cited

U.S. PATENT DOCUMENTS

| 6,101,607 A | * | 8/2000 | Bachand | G06F 21/629 |
| | | | | 719/328 |
| 7,647,404 B2 | | 1/2010 | Cooper et al. | |

(Continued)

FOREIGN PATENT DOCUMENTS

WO   WO-2014162296 A1   10/2014

OTHER PUBLICATIONS

"U.S. Appl. No. 15/142,274, Final Office Action dated Aug. 9, 2018", 16 pgs.

(Continued)

*Primary Examiner* — Jason Chiang
(74) *Attorney, Agent, or Firm* — Schwegman Lundberg & Woessner, P.A.

(57) ABSTRACT

Systems and techniques for real-time feature level software security are described herein. A request may be received from a computing device for data from the feature of the software application. The request for data may include authorization information of a user of the computing device. It may be identified that the feature of the software application contains code containing a reference to a security configuration service. A security configuration may be determined for the feature of the software application by comparing a resource identifier and a feature identifier of the feature of the software application to a set of security configurations of the security configuration service. The security configuration may provide access rules for the feature of the software application. A response may be sent to the computing device based on a comparison of the received authorization information of the user of the computing device to the determined security configuration.

17 Claims, 5 Drawing Sheets

(52) U.S. Cl.
CPC ...... *H04L 63/0435* (2013.01); *H04L 63/0815* (2013.01); *H04L 2463/103* (2013.01)

(56) References Cited

U.S. PATENT DOCUMENTS

| | | | |
|---|---|---|---|
| 7,908,645 B2 | 3/2011 | Varghese et al. | |
| 8,204,826 B2 | 6/2012 | Banaugh et al. | |
| 8,296,434 B1 | 10/2012 | Miller et al. | |
| 8,511,552 B2 | 8/2013 | Habraken | |
| 8,918,479 B2 | 12/2014 | O'Connell et al. | |
| 10,262,156 B1 | 4/2019 | Sanders et al. | |
| 2003/0033539 A1* | 2/2003 | Cheng | G06Q 20/3821 726/29 |
| 2003/0231767 A1* | 12/2003 | Carbajal | H04L 63/0428 380/200 |
| 2004/0111645 A1* | 6/2004 | Baffes | H04L 63/102 726/8 |
| 2006/0156020 A1* | 7/2006 | Minium | G06F 21/6218 713/182 |
| 2006/0156021 A1* | 7/2006 | Minium | H04L 63/102 713/182 |
| 2006/0190412 A1 | 8/2006 | Ostroff | |
| 2007/0104114 A1 | 5/2007 | Chu et al. | |
| 2008/0034438 A1* | 2/2008 | Mireku | G06F 21/6218 726/27 |
| 2008/0172750 A1* | 7/2008 | Keithley | G06F 21/41 726/28 |
| 2009/0205037 A1* | 8/2009 | Asakura | G06F 21/629 726/10 |
| 2010/0211996 A1 | 8/2010 | McGeehan et al. | |
| 2010/0229242 A1* | 9/2010 | Iga | G06F 21/51 726/27 |
| 2011/0208601 A1 | 8/2011 | Ferguson et al. | |
| 2012/0209773 A1 | 8/2012 | Ranganathan | |
| 2013/0036037 A1 | 2/2013 | Meredith et al. | |
| 2013/0145429 A1* | 6/2013 | Mendel | G06F 21/00 726/4 |
| 2013/0297513 A1 | 11/2013 | Kirillin et al. | |
| 2014/0258119 A1 | 9/2014 | Canis et al. | |
| 2015/0026208 A1* | 1/2015 | Kuhmuench | G06F 21/629 707/769 |
| 2015/0120572 A1 | 4/2015 | Slade | |
| 2016/0191310 A1 | 6/2016 | Brandwine et al. | |
| 2017/0085591 A1* | 3/2017 | Ganda | G06F 21/629 |
| 2017/0103198 A1* | 4/2017 | Kostadinov | G06F 21/45 |
| 2017/0310583 A1 | 10/2017 | Bernstein et al. | |

OTHER PUBLICATIONS

"U.S. Appl. No. 15/142,274, Non Final Office Action dated Feb. 5, 2018", 19 pgs.

"U.S. Appl. No. 15/142,274, Notice of Allowance dated Dec. 6, 2018", 8 pgs.

"U.S. Appl. No. 15/142,274, Response filed Jun. 5, 2018 to Non Final Office Action dated Feb. 5, 2018", 12 pgs.

"U.S. Appl. No. 15/142,274, Responde filed Nov. 9, 2018 to Final Office Action dated Aug. 9, 2018", 13 pgs.

"Track your finances with Online Banking Alerts", Bank of America, [Online].Retrieved from the Internet: <URL:https://www.bankofamerica.com/onlinebanking/education/online-banking-alerts.go>, (2017), 6 pgs.

"U.S. Appl. No. 16/706,401, Non Final Office Action dated Jul. 29, 2021", 17 pgs.

* cited by examiner

REAL-TIME FEATURE LEVEL SOFTWARE SECURITY

TECHNICAL FIELD

The present subject matter relates to the field of application security, and more specifically, but without limitation to, providing feature level security for applications in real-time.

BACKGROUND

Data breaches caused by external threats and internal security holes are becoming more commonplace. Existing security frameworks and standards may mitigate the risks of a data breach. However, the current techniques used to implement the existing security frameworks and standards may involve extensive modification of existing application code by an experienced application developer. As a result, there may be a delay between identification of a security risk and remediation.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
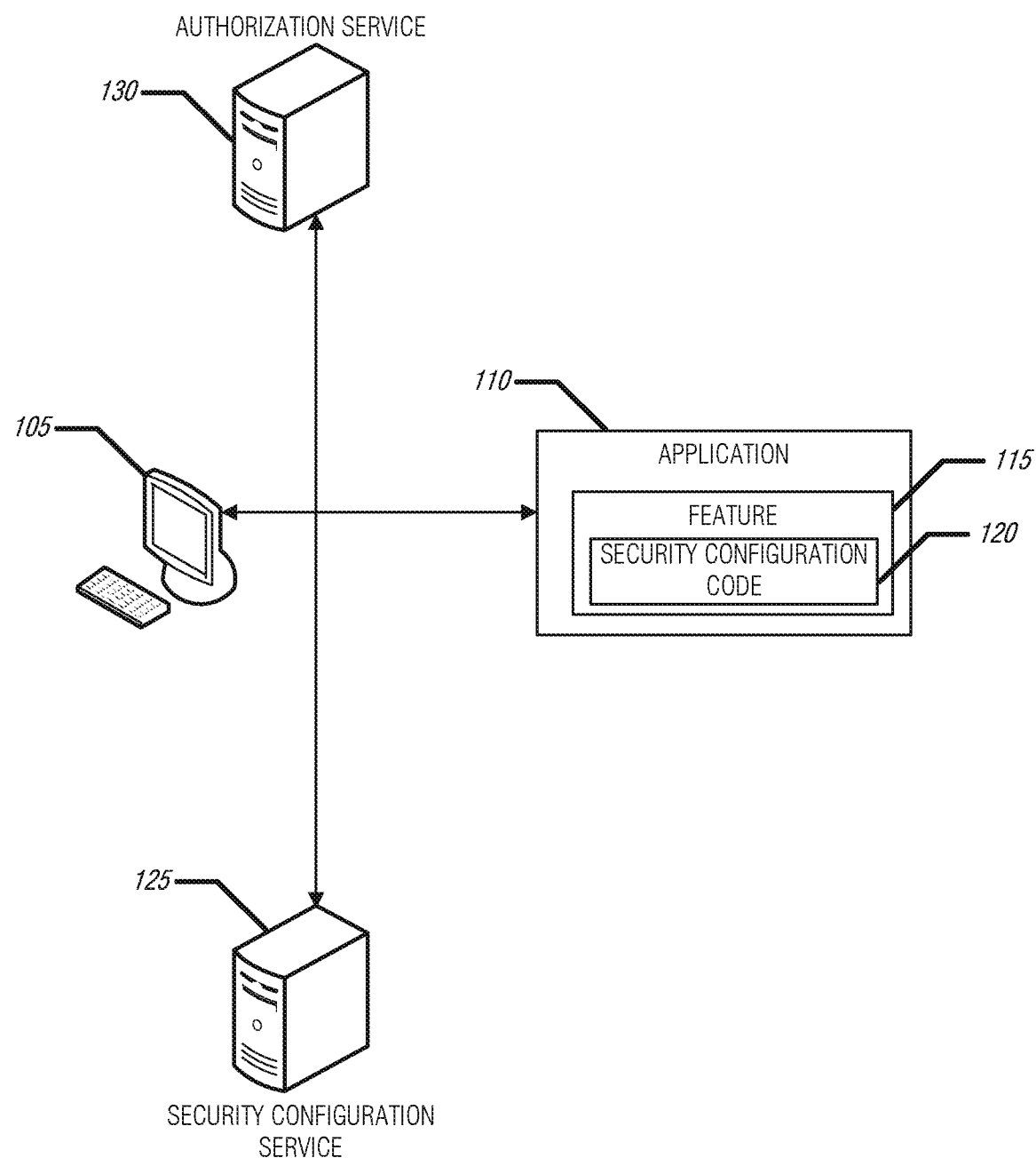
FIG. 1 illustrates a block diagram of an example of a system for real-time feature level software security, according to various embodiments.

Computer systems are threatened by external threats (e.g., hackers, etc.) and internal threats (e.g., security holes, disgruntled employees, etc.). Holes in application security may be exploited by an attacker to obtain confidential data that may be used for nefarious purposes (e.g., identity theft, credit card fraud, etc.). Existing security frameworks and standards may be employed to mitigate threats to computer systems. However, the existing techniques may involve a high level of subject matter expertise and extensive modification of existing code which may result in inconsistent and ineffective threat mitigation.

Systems and techniques for real-time feature level software security are disclosed herein that may reduce the complexity of threat mitigation by providing an end-to-end (e.g., application development, security management, client, server, etc.) application security framework. The presented techniques may provide a variety of benefits over traditional techniques including, but not limited to, reducing modification of existing code, providing consistent and secure authorization across multiple computer operating systems (e.g., Windows®, Linux, Unix, etc.), support for a variety of programming languages, command-line utilities (e.g., for securing automation, databases, support scripts, etc.), integration with existing and future enterprise systems (e.g., directory services, security systems, etc.), real-time permissions control, real-time threat detection and avoidance, and leveraging standards-based extensibility technology (e.g., APIs, etc.).

The present subject matter may be implemented using a variety of software development environments and/or technologies such as, for example, Java®, Python®, C, C++, Ruby, JavaScript®, C#, PHP, etc. In some examples, the present subject matter may provide command line utilities for securing application functions initiated at a command line such as, for example, automation, databases, scripts, etc. The present subject matter may be capable of integration with a number of current and future enterprise computing ecosystem components such as, for example, directory services, unified security management, user-based security management, identity access management, access control, etc. The present subject matter may allow real-time permissions changes by a compliance department employee without altering application code. The present subject matter may provide the ability to automatically perform real-time threat detection and avoidance. The present subject matter may leverage standard application program interfaces (APIs) and technologies for extensibility and compatibility. Other benefits may be realized by a person of ordinary skill in the art.

The term "feature" is used throughout this disclosure and as used herein may refer to a block of application code that may allow the application to perform a set of routines (e.g., initiating computer hardware, performing calculations, performing data manipulations, encrypting/decrypting data, etc.). It may also be understood that applications may contain a number of features that, when combined, comprise the functionality of the application.

FIG. 1 illustrates a block diagram of an example of a system 100 for real-time feature level software security, according to an embodiment. The system 100 may include a client computer 105 (e.g., personal computer, portable device, smartphone, tablet, etc.). The client computer 105 may be running an application 110 (e.g., executing locally, executing on a remote computer on a network, etc.). The client computer 105 may be communicatively coupled (e.g., over a network, etc.) to a security configuration service 125 and an authorization service 130. The application 110 may include one or more features 115 and each feature 115 may include security configuration code 120.

Figure 5:
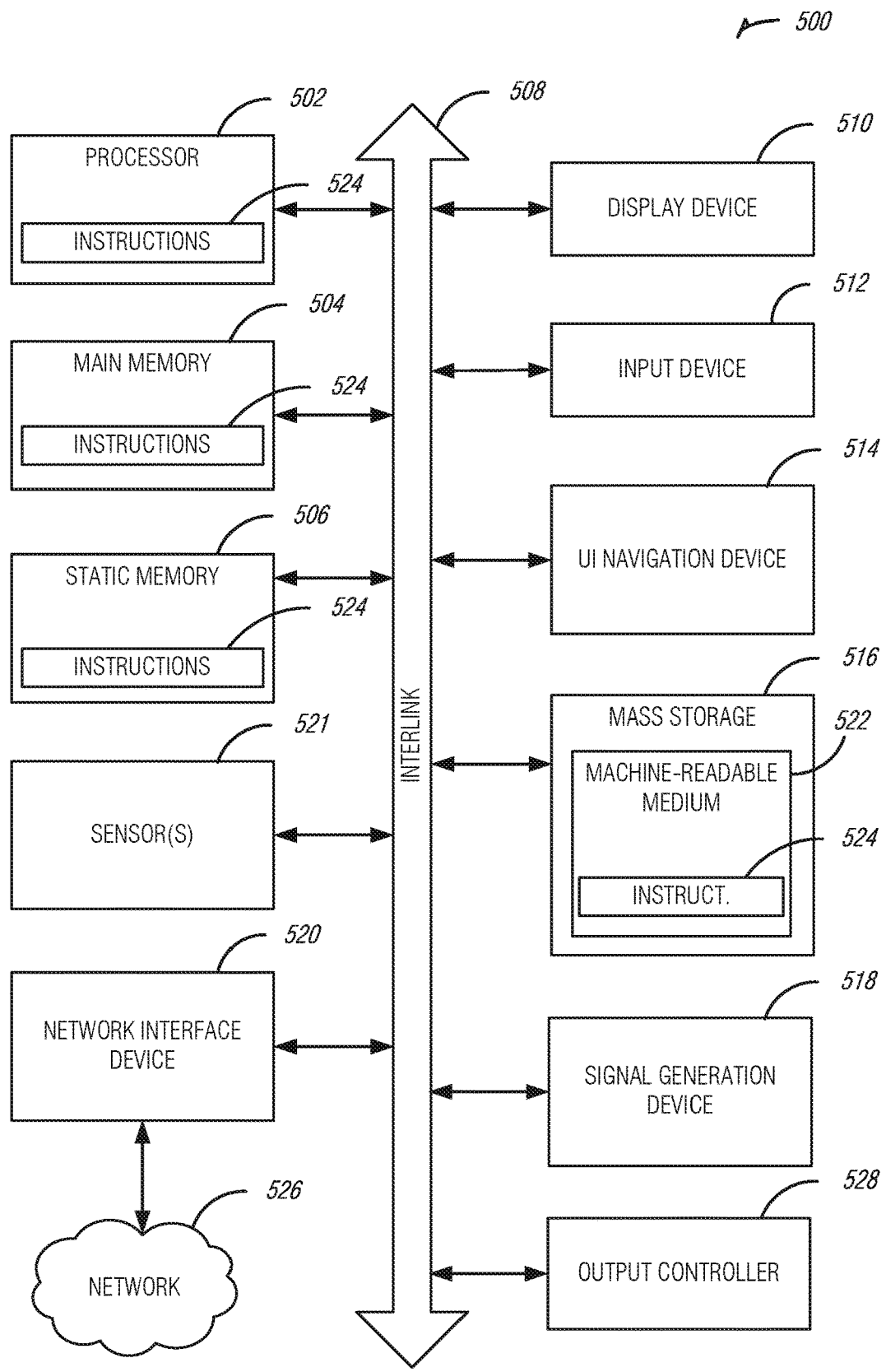
FIG. 5 is a block diagram illustrating an example of a machine upon which one or more embodiments may be implemented.

The security configuration service 125 and the authorization service 130 may comprise one or more processors (e.g., hardware processor 502 described in FIG. 5, etc.) that execute software instructions, such as those used to define a software or computer program, stored in a computer-readable storage medium such as a memory device (e.g., a main memory 504 and a static memory 506 as described in FIG. 5, a Flash memory, random access memory (RAM), or any other type of volatile or non-volatile memory that stores instructions), or a storage device (e.g., a disk drive, or an optical drive). Alternatively, the security configuration service 125 and the authorization service 130 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of the foregoing examples of dedicated hardware, for performing the techniques described in this disclosure. The security configuration service 125 and the authorization service may be implemented one a single computing device (e.g., physical server, virtual server, client computer, etc.) and their respective functions may be distributed across multiple computing devices (e.g., a collection of networked servers, cloud computing instance, etc.).

The authorization service 130 may provide authorization of presented (e.g., transmitted, received, input by a user, transmitted by a web server, etc.) identities (e.g., user account, computer account, etc.). The authorization service 130 may employ a variety of authorization techniques including, but not limited to, single sign-on, federation, kerberos, and x509 certificates. The authorization service 130 may employ a variety of encryption techniques such as secure sockets layer. The authorization service 130 may be communicatively coupled to a variety of security data bases containing security account information (e.g., user names, passwords, group membership, roles, etc.). The authorization service 130 may receive an authorization request and in response may issue a token including a set of security information (e.g., group membership, claims, rights, entitlements, etc.).

The security configuration service 125 may include a variety of security configurations that may define the actions that an entity (e.g., user, computer, etc.) may perform for an application feature such as feature 115 of application 110. For example, a user in a specific user group may be able to encrypt data sent between the client computer 105 and the application 110 using an encryption feature of the application 110. The security configurations may use a variety of permissions models such as role based permissions, user based permissions, user group based permissions, and computer group based permissions. Resources and features may have identifiers that allow them to be identified throughout the system. The identifiers may be implemented in a variety of ways including, for example, text strings, tokens, keys, etc. The security configurations may be organized by the security configuration service 125 using a resource identifier (e.g., identifying an application, etc.) and a feature identifier (e.g., identifying an encryption feature, etc.).

The security configurations may be read by a client or server computer before determining to allow access a feature of an application. For example, an application server (e.g., a webserver, database server, etc.) may read the security configuration when a user requests a feature of an application hosted by the application server. In some examples, an application may include a server component (e.g., running on an application server, etc.) and a client component (e.g., running on a user computer, handheld device, etc.) and the security configurations may be accessed by the client component when a user accesses the application using the client component.

Figure 3A:
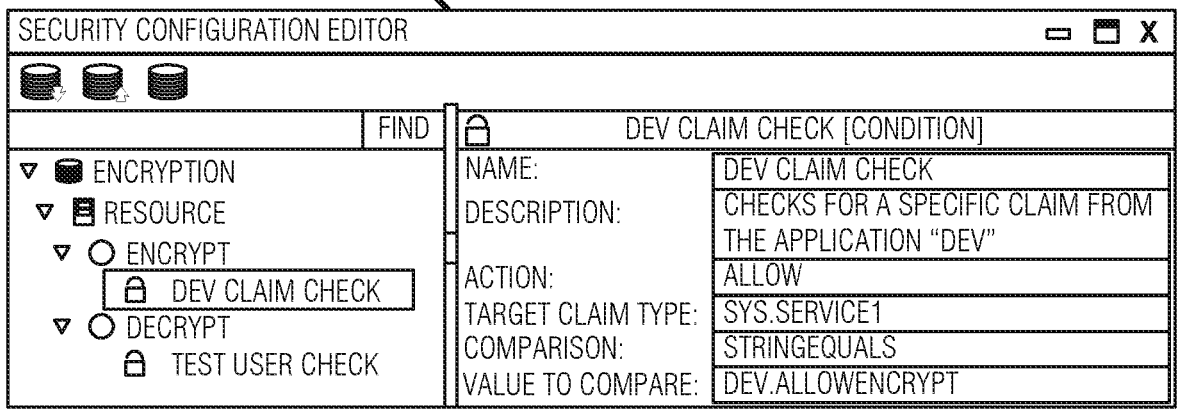
FIGS. 3A & 3B illustrate an example of a graphical user interface for use in implementing real-time feature level software security, according to various embodiments.
Figure 3B:
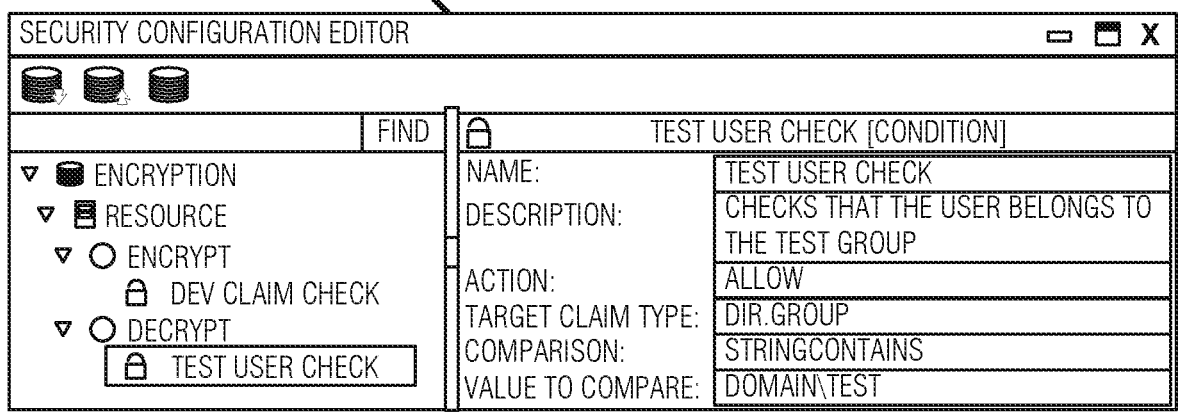

The security configurations may be separated from the application. Thus, changes may be made to a security configuration without modifying application code. For example, the security configuration may be defined or updated by a person that may not have application programming skills (e.g., compliance personnel, security personnel, etc.). In some embodiments, a graphical user interface may be provided to aid in maintenance of security configurations as shown in FIGS. 3A & 3B. In addition, security configuration changes may be made in real-time. The changes may be effectuated instantaneously or the next time a person requests the feature of the application.

The application 110 may include a variety of features such as feature 115. Each feature may be a collection of programming code that may be responsible for performing one or more actions (e.g., data handling, calculations, etc.). Each feature may include a block of security configuration code such as security configuration code 120. The security configuration code 120 may specify a variety of configuration items such as a security configuration provider (e.g., security configuration service 125), a resource name, an application name, an authorization provider (e.g., authorization service 130), and an encryption provider. In some embodiments, the configuration information may be read using an application programming interface (API) call. The configuration items may be used to communicate with the security configuration service 125 and the authorization service 130 to determine a set of actions that an entity is allowed (or not allowed) to perform for the feature 115 of the application 110. Reference is made to the security configuration code 120 being included in the feature 115 however it will be readily understood that the security configuration code may be provided in a variety of configurations such as included in a block of global code included in the application and split between a global code block and the feature code block.

A request may be received (e.g., by an application server, an application, etc.) from an entity (e.g., user, computer, another application, etc.) for data (e.g., a calculation result, data retrieval, etc.) from the feature 115 of the software application 110. The request for data may include authorization information (e.g., username, password, etc.) of a sender of the request (e.g., user, computer, another application, etc.). It may be identified by a client component or application server (e.g., via API call, etc.) that the feature of the software application contains code containing a reference to a security configuration service (e.g., security configuration service 125). For example, an API call may be initiated by an application server hosting the application 110 upon receiving a request for the feature 115.

A security configuration may be determined for the feature of the software application by comparing (e.g., using semantic matching, etc.) a resource identifier and a feature identifier of the feature of the software application to a set of security configurations of the security configuration service. For example, an application server hosting the application 110 may send an API call to the security configuration service 125 including a resource identifier and a feature identifier and the security configuration service 125 may return a security configuration corresponding to the identifiers. The security configuration may provide access rules for the feature of the software application (e.g., read, write, perform certain calculations, retrieve certain data, encrypt data, etc.). In some examples, the security configuration may include a set of access entitlements (e.g., a set of access rights, etc.).

A response may be sent (e.g., by an application server, client component, etc.) to the sender of the request for data based on a comparison of the received authorization information to the determined security configuration. For example, a user's (e.g., sender of the request) account may be included in a security group "test users" and the security configuration information may allow users in the test users group to retrieve an unencrypted list of customer names. The unencrypted list of customer names may be sent to the user upon receiving security information indicating that the user's account is in the test users group. In an example, comparing the received authorization information to the security configuration may include comparing a user entitlement of the set of user entitlements with an access entitlement included in the security configuration. In some examples, the set of access entitlements may include granular rules (e.g., individual rules for sub-features of the feature, etc.) to perform operations using the feature of the software application.

In some embodiments, it may be determined (e.g., by an application server, client component, etc.), using the security configuration, that a data item identified in the request for data should be encrypted before transmission. For example, a security configuration may be retrieved by an application server for the feature 115 of the application 110 that indicates that a data item should be encrypted before transmission to the user. The application server may interact with an encryption provider (e.g., local encryption processor, remote encryption service, etc.) to encrypt the data item before transmitting the data item to the user. The data item may be encrypted using an encryption algorithm. The encrypted data item may be included in the response to the sender. In some embodiments, it may be determined, using the security configuration, that a first data item identified in the request for data should be encrypted before transmission and a second data item identified in the request of data should be transmitted unencrypted. The first data item may be encrypted using an encryption algorithm. The encrypted first data item and the unencrypted second data item may be included in the response to the sender. In some embodiments, the software application may contain code containing a reference to an encryption processor (e.g., an encryption server, cryptographic processor, etc.). The data item may be encrypted by the encryption processor.

In some examples, statistics corresponding to the request for data may be gathered (e.g., frequency of request, average number of requests, geographic offset between the request and prior requests, number of data items requested, composition of requested data, etc.). A deviation may be determined between the statistics and a model of a standard request for data. For example, it may be determined that a model request contains a request for data type A, data type C, and data type Y and the current request is requesting data type A, data type C, and data type Z. Access to the feature of the application may be blocked based on the deviation. Thus, threats may be determined based on statistical deviations in real-time upon requesting access to an application feature.

In some embodiments, a security configuration graphical user interface (e.g., application window, web page, etc.) may be generated by an administration service (e.g., an administration server, administration application, etc.) for displayed on a client device (e.g., via a display device in a computing device, etc.). A set of inputs (e.g., pointer clicks, drag and drop, keystrokes, etc.) may be received via the security configuration user interface. The security configuration may be generated using the received set of inputs. For example, the security configuration may be generated based on a combination of keystrokes and mouse clicks. In some example, the generated security configuration may be stored in a database.

Figure 2:
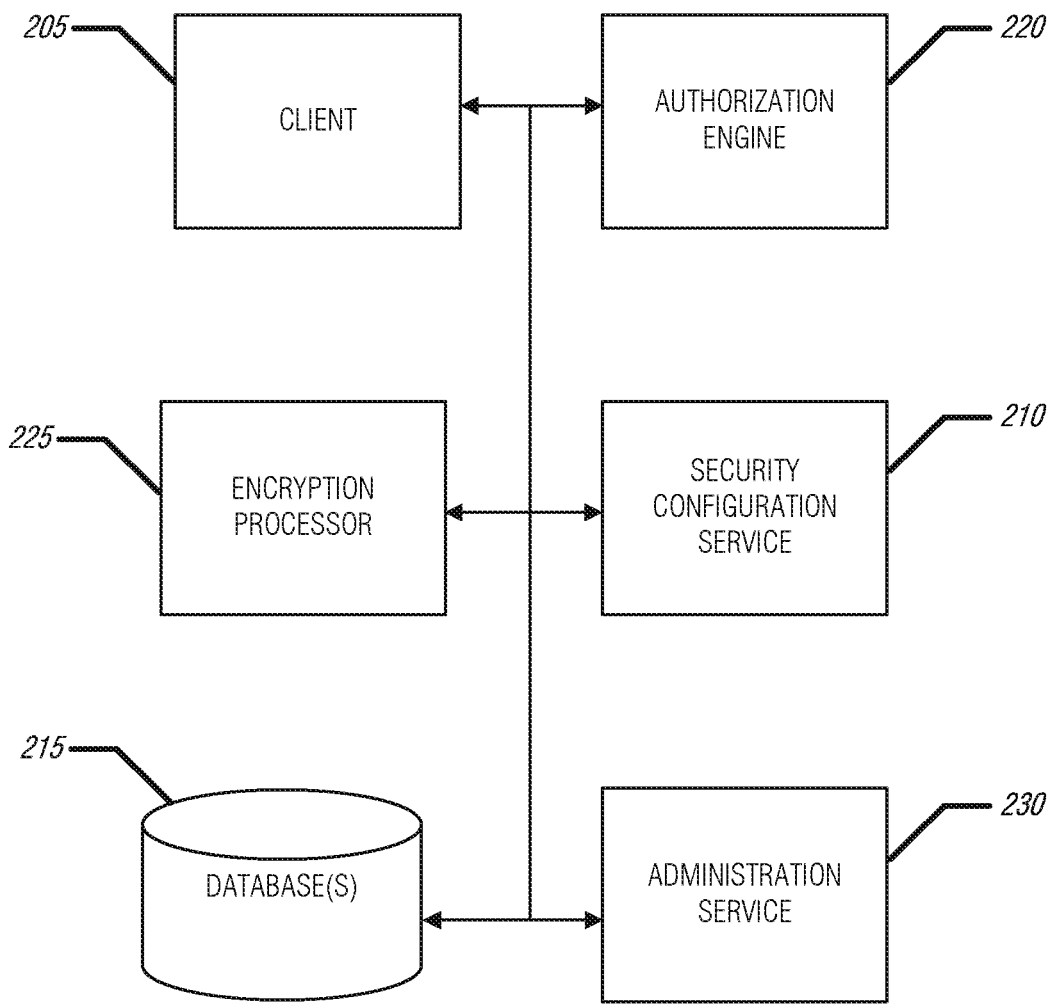
FIG. 2 illustrates a block diagram of an example of a system for real-time feature level software security, according to various embodiments.

FIG. 2 illustrates a block diagram of an example of a system 200 for real-time feature level software security, according to an embodiment. The system 200 may provide similar functionality as described in FIG. 1. The system 200 may be executed on one or more computer systems (e.g., server computer, client computer, virtual server, cloud service, etc.) communicatively coupled to a network (e.g., wired network, wireless network, etc.) and may include a client 205, a security configuration service 210, an authorization engine 220, an encryption processor 225, one or more databases 215, and an administration service 230.

The client 205 (e.g., computer, smartphone tablet, web client, etc.) may be used by a user to execute software applications (e.g., the application 110 described in FIG. 1). The client 205 may be participating in a computer network (e.g., wired network, wireless network, etc.). A variety of configurations may be used in delivering an application for use by the client 205. An application executed by the client 205 may be installed locally or may be running remotely on a network connected application server. Upon execution of the application a request may be sent requesting access to a feature of the application.

The authorization engine 220 may be responsible for providing authorization services for a computer network. The authorization engine 220 may be communicatively coupled to a variety of security databases (e.g., user account database, directory services database, computer account database, etc.) and security applications (e.g., directory services, user permission manager, role management, user matrix manager, etc.) that the authorization engine 220 may use to verify the authorization of credentials provided by an entity (e.g., a user, computer, application, etc.) requesting access to a resource. Upon receiving a request for authorization, the authorization engine 220 may query the security databases and security applications to determine if the authorization information (e.g., account name, password, role, etc.) is authentic.

In some examples, the authorization engine 220 may be using single sign on (SSO), and a single set of credentials may be used to access a number of resources each having a unique set of individual credentials. The authorization engine 220 may maintain a matrix of credentials indexed to the single set of credentials. An entity may present the single set of credentials for authorization to a resource having a unique set of credentials and the authorization engine 220 may reference the matrix to verify that the unique set of credentials is indexed to the single set of credentials. Thus, the entity may present the single set of credentials for authorization to a variety of resources. In some examples, the authorization engine 220 may respond to an authorization request including the single set of credentials by generating a token including a set of issued claims (e.g., a claims-based identity, etc.). The set of issued claims may include a variety of authorization information (e.g., validated credentials, resource permissions, etc.). The token may be used to determine if the entity should be granted (or denied) access to a resource (e.g., a file share, an application, a database, an encryption service, etc.).

In some examples, the authorization engine 220 may be identified in a block of code of an application for providing authorization for features of the application. For example, an application may contain a block of code identifying the authorization engine 220 as an authorization provider and when a user requests a data item from a feature of the application a request may be sent to the authorization engine 220 requesting authorization of authorization information provided by the user.

The encryption processor 225 may be responsible for providing encryption services for a computer network. The encryption processor 225 may receive a request to encrypt data. The request may include a token generated by the authorization engine 220. The encryption processor 225 may fulfill the request to encrypt the data based on the token. Similarly, the encryption processor 225 may receive a request to decrypt data. The request may include a token generated by the authorization engine 220. The encryption engine 225 may fulfill the request to decrypt the data based on the token. In some examples, the encryption processor 225 may be identified in a block of code in a software application and encryption/decryption requests may be sent to the encryption processor 225 based on the identification in the block of code. For example, an application may contain a block of code identifying the encryption processor 225 as an encryption provider and a user may request a data item from a feature of the application. A request may be sent to the encryption processor 225 to encrypt the data item before it is sent to the user.

The security configuration service 210 may be responsible for maintaining security configurations for applications. The functionality of the security configuration service 210 may be similar to the security configuration service 125 as described in FIG. 1. The security configuration service 210 may be communicatively coupled to one or more databases 215 for storing security configurations. The security configurations may be indexed using a variety of indexing schemes, for example, a security configuration may be indexed by a resource identifier and a feature identifier. A security configuration may include one or more rules (e.g., permission level, data access permissions, etc.) defining access to a resource (e.g., an application, a feature of an application, a server, etc.). The security configuration may contain a set of entitlements based on a component of authorization information. For example, users in a test user group may be entitled to obtain unencrypted data from a feature of an application.

In some examples, an application may contain a block of code identifying the security configuration service 210 as a security configuration provider. Upon receiving a request for access to a feature of the application, the application (or an application server) may send a request to the security configuration service 210 including authorization information for the requester. A security configuration may be determined for the requested feature of the application by the security configuration service 210 using a resource identifier and a feature identifier included in the request. The authorization information may be compared to the security configuration to determine the appropriate access to the feature of the application. For example, the security configuration for a data retrieval feature of an application may entitle users with a role of manager to retrieve data from data sources A, B, and C and may entitle users with a user role to retrieve data from data source A. When a user with role user accessing the application may be allowed to use the data retrieval feature of the application with data retrieved from data source A and not data sources B and C.

The administration service 230 may include a graphical user interface for maintaining (e.g., creating, updating, etc.) security configurations. The administration service 230 may be provided as a stand-alone application or may be provided by another network component. In some examples, the security configuration service 210 and the administration service 210 may be implemented on the same (or separate) hardware. The administration service 230 may provide the ability to create or modify security configurations as described above. The security configurations may be stored in the one or more databases 215. A user may be able to select a security configuration to modify using a variety of user interface elements (e.g., textboxes, dropdown boxes, buttons, radio buttons, selection boxes, sliders, etc.) provided by the graphical user interface. Likewise, the user may be able to use a variety of user interface elements to create a new security configuration. Example graphical user interfaces are provided in FIGS. 3A and 3B.

The client 205, security configuration service 210, authorization engine 220, encryption processor 225, and administration service 230 may comprise one or more processors (e.g., hardware processor 502 described in FIG. 5, etc.) that execute software instructions, such as those used to define a software or computer program, stored in a computer-readable storage medium such as a memory device (e.g., a main memory 504 and a static memory 506 as described in FIG. 5, a Flash memory, random access memory (RAM), or any other type of volatile or non-volatile memory that stores instructions), or a storage device (e.g., a disk drive, or an optical drive). Alternatively, the client 205, security configuration service 210, authorization engine 220, encryption processor 225, and administration service 230 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of the foregoing examples of dedicated hardware, for performing the techniques described in this disclosure.

FIGS. 3A & 3B illustrate an example of a graphical user interface (GUI) for use in implementing real-time feature level software security, according to an embodiment. FIGS. 3A & 3B are an examples of a security configuration editor graphical user interface. FIGS. 3A & 3B may be used for creating and editing security configurations as described in FIGS. 1 & 2.

FIG. 3A illustrates a graphical user interface 305 for editing a Dev Claim Check condition for an Encrypt resource. The Dev Claim Check condition may allow access to the Encrypt resource if a claim presented (e.g., a claim issued by the authorization engine 220 as described in FIG. 2) has a value that matches DEV.ALLOWENCRYPT. If the value in the claim matches the value in the condition the user may be allowed to access the Encrypt resource (e.g., to encrypt content, etc.).

FIG. 3B illustrates a graphical user interface 310 for editing a Test User Check condition for a Decrypt resource. The Test User Check condition may allow access to the Decrypt resource if authorization information for a user indicates the user is a member of a group DOMAIN\TEST. In the user's account matches the condition the user may be allowed access to the Decrypt resource (e.g., the decrypt content, etc.).

As shown in FIGS. 3A & 3B and described in FIGS. 1 & 2, the security configurations may be indexed using a variety of indexing schemes. For example, the security configurations may be organized in a hierarchical structure with child features cascading from parent resources. It will be readily understood that a variety of organizational methods may be used and that a database containing the security configuration may be organized differently (or the same) as a graphical user interface used to manage the security configurations such as graphical user interfaces 305 & 310. In some examples, child features may inherit the security configuration of a parent feature. For example, if a new feature is added as a child of an existing feature, the new feature may inherit the security configuration of the existing feature. Thus, it may not be necessary to create a new security configuration for each new feature.

Figure 4:
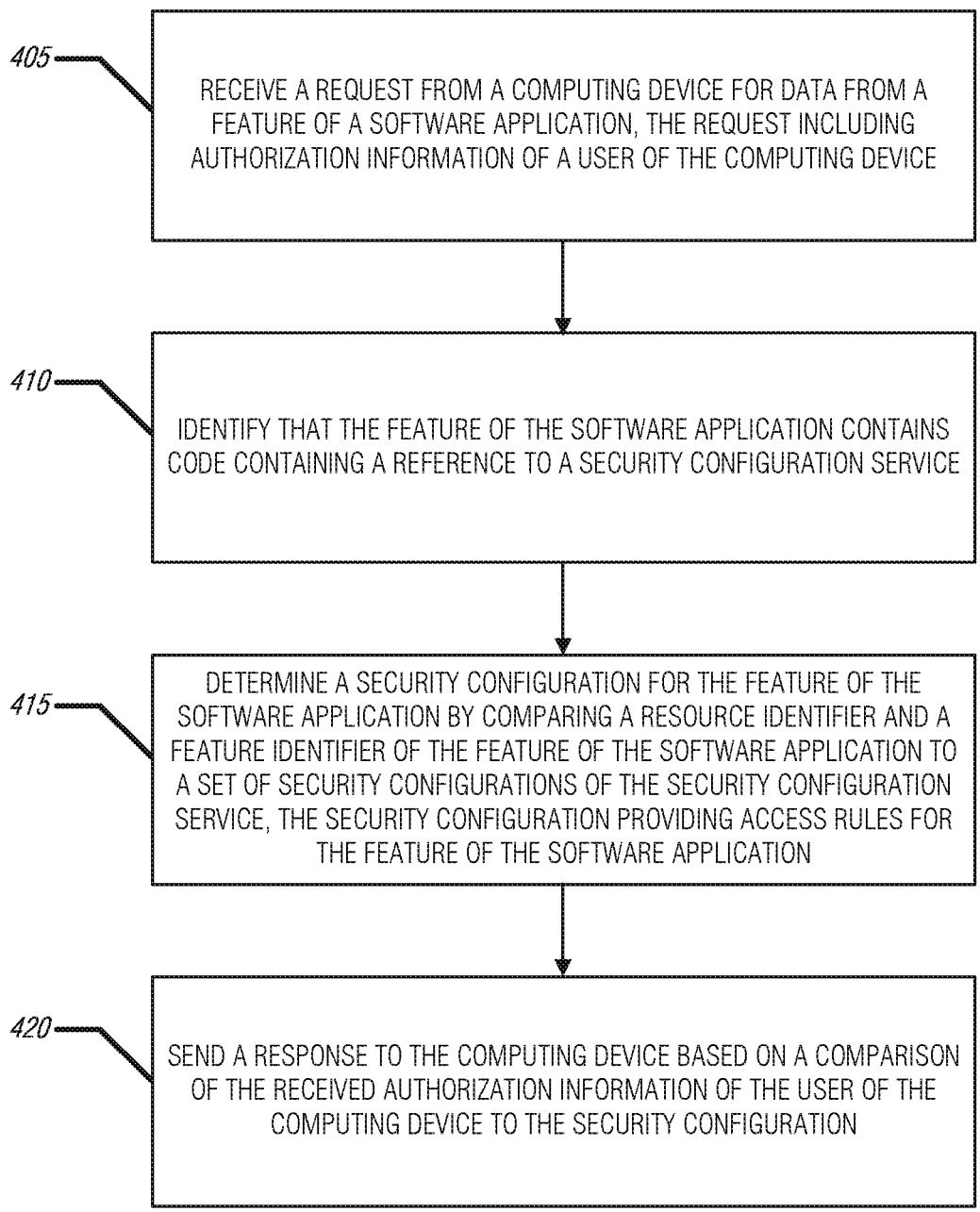
FIG. 4 illustrates flow diagram of an example of a method for real-time feature level software security, according to various embodiments.

FIG. 4 illustrates flow diagram of an example of a method 400 for real-time feature level software security, according to an embodiment. The method. 400 may provide security for a feature of a software application in real-time. The method 400 may provide similar functionality to that described in FIG. 1 and may employ a variety of components described in FIGS. 2 & 5.

At operation 405, a request may be received from a computing device (e.g., the client 205 as described in FIG. 2) for data from a feature (e.g., feature 115 as described in FIG. 1) of a software application (e.g., application 110 as described in FIG. 1). The request may include authorization information of a user of the computing device (e.g., a user of client 205).

At operation 410, it may be identified that a feature of the software application contains code containing a reference to a security configuration service (e.g., the security configuration code 120 as described in FIG. 1).

At operation 415, a security configuration may be determined for the feature of the software application (e.g., by the security configuration service 220 as described in FIG. 2) by comparing a resource identifier and a feature identifier of the feature of the software application to a set of security configurations of the security configuration service (e.g., using semantic matching, etc.). The security configuration may provide rules for the feature of the software application (e.g., access permissions, rights, etc.).

In some embodiments, the security configuration may include a set of access entitlements (e.g., sets of permissions, etc.). In an example, the set of access entitlements may include granular rules to perform operations using the feature of the software application. For example, an encryption entitlement may allow a user to encrypt and decrypt data in data field A, but may not allow the user to encrypt and decrypt data in data field B. In some embodiments, the authorization information may include a set of user entitlements corresponding to the user of the computing device (e.g., a set of permissions, group memberships, etc. corresponding to the user). Comparing the received authorization information to the security configuration may include comparing a user entitlement of the set of user entitlements with an access entitlement included in the security configuration. For example, a user may have an entitlement indicating that the user has an "Author" role. The access entitlements may indicate that the Author role has read, write, and delete access for a feature of an application. The user entitlement of Author role may be compared to the access entitlement for Author roles to grant the user read, write, and delete access to the feature.

At operation 420, a response (e.g., one or more data items requested, etc.) may be sent to the computing device based on a comparison of the received authorization information of the user of the computing device to the determined security configuration. For example, the request may be seeking data items A, B, and C from the feature of the application and the comparison may indicate that the user is allowed access to data items A and B, but not data item C. The response may include data items A and B.

In some embodiments, statistics may be gathered corresponding to the request for data (e.g., frequency of request, average time of request, etc.). A deviation may be determined between the statistics and a model of a standard request for data (e.g., standard frequency of request, standard time of request, etc.). Access may be blocked (e.g., no data returned, error message returned, etc.) to the feature of the software application based on the deviation.

In some embodiments, a security configuration graphical user interface (e.g., security configuration editor as described in FIGS. 3A & 3B, etc.) may be displayed (e.g., by the administration service 230 as described in FIG. 2, etc.). A set of inputs (e.g., mouse clicks, keyboard entries, etc.) may be received via the security configuration graphical user interface. The security configuration may be generated using the received set of inputs.

In some embodiments, it may be determined using the security configuration that a data item identified in the request for data should be encrypted (e.g., by the encryption processor 225 as described in FIG. 2, etc.) before transmission (e.g., sent to the computing device, presented for display, etc.). The data item may be encrypted using an encryption algorithm (e.g., RSA, advanced encryption standard (AES), triple data encryption standard (DES), etc.). The encrypted data item may be included in the response sent to the computing device. In some embodiments, it may be determined using the security configuration that a first data item identified in the request for data should be encrypted before transmission and a second data item identified in the request for data shout be transmitted unencrypted. The first data item may be encrypted using an encryption algorithm. The encrypted first data item and the unencrypted second data item may be included in the response sent to the computing device.

FIG. 5 illustrates a block diagram of an example machine 500 upon which any one or more of the techniques (e.g., methodologies) discussed herein may perform. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 500 may include a hardware processor 502 (e.g., a central processing unit (CPU), a graphics processing unit (GPU), a hardware processor core, or any combination thereof), a main memory 504 and a static memory 506, some or all of which may communicate with each other via an interlink (e.g., bus) 508. The machine 500 may further include a display unit 510, an alphanumeric input device 512 (e.g., a keyboard), and a user interface (UI) navigation device 514 (e.g., a mouse). In an example, the display unit 510, input device 512 and UI navigation device 514 may be a touch screen display. The machine 500 may additionally include a storage device (e.g., drive unit) 516, a signal generation device 518 (e.g., a speaker), a network interface device 520, and one or more sensors 521, such as a global positioning system (GPS) sensor, compass, accelerometer, or other sensor. The machine 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 516 may include a machine readable medium 522 on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the machine 500. In an example, one or any combination of the hardware processor 502, the main memory 504, the static memory 506, or the storage device 516 may constitute machine readable media.

While the machine readable medium 522 is illustrated as a single medium, the term "machine readable medium" may include a single medium or multiple media (e.g., a centralized or distributed database, and/or associated caches and servers) configured to store the one or more instructions 524.

The term "machine readable medium" may include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (NEMO), or multiple-input single-output (MISO) techniques. The term "transmission medium" shall be taken to include any intangible medium that is capable of storing, encoding or carrying instructions for execution by the machine 500, and includes digital or analog communications signals or other intangible medium to facilitate communication of such software.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective teens "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A system for providing security for a feature of a software application in real-time, the system comprising:
   at least one processor; and
   a memory including instructions that, when executed by the at least one processor, cause the at least one processor to:
   receive a request, from a computing device, for data from the feature of the software application that includes authorization information of a user of the computing device;
   gather statistics corresponding to the request for data;
   determine a deviation between the statistics and a model of a standard request for data;
   block access to the feature of the software application based on the deviation;
   identify that the feature of the software application contains a block of security configuration code that includes a reference to a security configuration service and an authorization service;
   determine a security configuration for the feature of the software application by comparing a set of identifiers of the feature to a security configuration of the security configuration service to determine access rules for portions of code associated with functions of the feature; and
   upon verification of the authorization information by the authorization service, provide access to the functions of the feature based on the security configuration.

2. The system of claim 1, wherein the verification of the authorization information by the authorization service includes a comparison of the authorization information to the security configuration for the feature.

3. The system of claim 2, wherein the security configuration for the feature includes a set of access entitlements;
   wherein the authorization information includes a set of user entitlements corresponding to the user of the computing device; and
   wherein the comparison of the authorization information to the security configuration for the feature includes a comparison of a user entitlement of the set of user entitlements to an access entitlement of the set of access entitlements included in the security configuration for the feature.

4. The system of claim 1, wherein the instructions further cause the at least one processor to:
   display a security configuration graphical user interface;
   receive a set of inputs via the security configuration graphical user interface; and
   generate the security configuration for the feature using the received set of inputs.

5. The system of claim 1, wherein the instructions further cause the at least one processor to:
   determine, using the security configuration for the feature, that a data item identified in the request for data be encrypted before transmission;
   encrypt the data item, as an encrypted data item, using an encryption algorithm; and
   upon verification of the authorization information by the authorization service, send the encrypted data item in a response to the computing device.

6. The system of claim 1, wherein the instructions further cause the at least one processor to:
   determine, using the security configuration for the feature, that a first data item identified in the request for data be encrypted before transmission and a second data item identified in the request for data be transmitted unencrypted;
   encrypt the first data item, as an encrypted first data item, using an encryption algorithm; and
   upon verification of the authorization information by the authorization service, send the encrypted first data item and the second data item in a response to the computing device.

7. At least one non-transitory computer readable medium including instructions for providing security for a feature of a software application in real-time that when executed by at least one processor, cause the at least one processor to:
   receive a request, from a computing device, for data from the feature of the software application that includes authorization information of a user of the computing device;
   gather statistics corresponding to the request for data;
   determine a deviation between the statistics and a model of a standard request for data;
   block access to the feature of the software application based on the deviation;
   identify that the feature of the software application contains a block of security configuration code that includes a reference to a security configuration service and an authorization service;
   determine a security configuration for the feature of the software application by comparing a set of identifiers of the feature to a security configuration of the security configuration service to determine access rules for portions of code associated with functions of the feature; and
   upon verification of the authorization information by the authorization service, provide access to the functions of the feature based on the security configuration.

8. The non-transitory computer readable medium of claim 7, wherein the verification of the authorization information by the authorization service includes a comparison of the authorization information to the security configuration for the feature.

9. The non-transitory computer readable medium of claim 8, wherein the security configuration for the feature includes a set of access entitlements;
   wherein the authorization information includes a set of user entitlements corresponding to the user of the computing device; and
   wherein the comparison of the authorization information to the security configuration for the feature includes a comparison of a user entitlement of the set of user entitlements to an access entitlement of the set of access entitlements included in the security configuration for the feature.

10. The non-transitory computer readable medium of claim 7, wherein the instructions further cause the at least one processor to:
display a security configuration graphical user interface;
receive a set of inputs via the security configuration graphical user interface; and
generate the security configuration for the feature using the received set of inputs.

11. The non-transitory computer readable medium of claim 7, wherein the instructions further cause the at least one processor to:
determine, using the security configuration for the feature, that a data item identified in the request for data be encrypted before transmission;
encrypt the data item, as an encrypted data item, using an encryption algorithm; and
upon verification of the authorization information by the authorization service, send the encrypted data item in a response to the computing device.

12. The non-transitory computer readable medium of claim 7, wherein the instructions further cause the at least one processor to:
determine, using the security configuration for the feature, that a first data item identified in the request for data be encrypted before transmission and a second data item identified in the request for data be transmitted unencrypted;
encrypt the first data item, as an encrypted first data item, using an encryption algorithm; and
upon verification of the authorization information by the authorization service, send the encrypted first data item and the second data item in a response to the computing device.

13. A method for providing security for a feature of a software application in real-time, the method comprising:
receiving a request, from a computing device, for data from the feature of the software application that includes authorization information of a user of the computing device;
gathering statistics corresponding to the request for data;
determining a deviation between the statistics and a model of a standard request for data;
blocking access to the feature of the software application based on the deviation;
identifying that the feature of the software application contains a block of security configuration code that includes a reference to a security configuration service and an authorization service;
determining a security configuration for the feature of the software application by comparing a set of identifiers of the feature to a security configuration of the security configuration service to determine access rules for portions of code associated with functions of the feature; and
upon verification of the authorization information by the authorization service, providing access to the functions of the feature based on the security configuration.

14. The method of claim 13, wherein the verification of the authorization information by the authorization service includes a comparison of the authorization information to the security configuration for the feature.

15. The method of claim 14, wherein the security configuration for the feature includes a set of access entitlements;
wherein the authorization information includes a set of user entitlements corresponding to the user of the computing device; and
wherein the comparison of the authorization information to the security configuration for the feature includes a comparison of a user entitlement of the set of user entitlements to an access entitlement of the set of access entitlements included in the security configuration for the feature.

16. The method of claim 13, further comprising:
displaying a security configuration graphical user interface;
receiving a set of inputs via the security configuration graphical user interface; and
generating the security configuration for the feature using the received set of inputs.

17. The method of claim 13, further comprising:
determining, using the security configuration for the feature, that a data item identified in the request for data be encrypted before transmission;
encrypting the data item, as an encrypted data item, using an encryption algorithm; and
upon verification of the authorization information by the authorization service, sending the encrypted data item in a response to the computing device.

* * * * *

UNITED STATES PATENT AND TRADEMARK OFFICE
CERTIFICATE OF CORRECTION

Page 1 of 1

PATENT NO. : 11,132,465 B1
APPLICATION NO. : 16/384261
DATED : September 28, 2021
INVENTOR(S) : Sanders et al.

It is certified that error appears in the above-identified patent and that said Letters Patent is hereby corrected as shown below:

On the Title Page

On page 2, in Column 2, item (56) under "Other Publications", Line 7, delete "Responde" and insert --Response-- therefor Signed and Sealed this
Twenty-third Day of November, 2021

Drew Hirshfeld
*Performing the Functions and Duties of the*
*Under Secretary of Commerce for Intellectual Property and*
*Director of the United States Patent and Trademark Office*